(12) United States Patent
Chen

(10) Patent No.: US 11,872,661 B2
(45) Date of Patent: Jan. 16, 2024

(54) DISASSEMBLING DEVICE

(71) Applicant: TRIPLE WIN TECHNOLOGY(SHENZHEN) CO. LTD., Shenzhen (CN)

(72) Inventor: Yong-Man Chen, Kunshan (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 81 days.

(21) Appl. No.: 17/726,694

(22) Filed: Apr. 22, 2022

(65) Prior Publication Data

US 2023/0014368 A1 Jan. 19, 2023

(30) Foreign Application Priority Data

Jul. 9, 2021 (CN) .......................... 202110777953.9

(51) Int. Cl.
*B23P 19/00* (2006.01)
*B23P 19/02* (2006.01)

(52) U.S. Cl.
CPC .................................. *B23P 19/025* (2013.01)

(58) Field of Classification Search
CPC ....... B23P 19/025; B23P 19/00; B23P 19/006; B23P 19/041; B23Q 3/00; B23Q 3/06; B23Q 3/069; B23Q 3/154
See application file for complete search history.

(56) References Cited

U.S. PATENT DOCUMENTS

| 4,492,356 | A | * | 1/1985 | Taniguchi | B23Q 1/34 144/144.1 |
| 4,766,465 | A | * | 8/1988 | Takahashi | G03F 7/708 228/49.1 |
| 5,730,433 | A | * | 3/1998 | Veres | B25B 5/142 269/134 |
| 5,873,567 | A | * | 2/1999 | Williams | B27F 7/155 269/304 |
| 5,947,460 | A | * | 9/1999 | Williams | B23Q 16/001 269/910 |
| 6,113,088 | A | * | 9/2000 | Gakhar | B25B 5/105 269/220 |
| 6,390,894 | B1 | * | 5/2002 | Beel | B23F 23/1225 451/232 |
| 6,435,941 | B1 | * | 8/2002 | White | H01L 21/68707 451/287 |

(Continued)

*Primary Examiner* — Lee D Wilson
(74) *Attorney, Agent, or Firm* — ScienBiziP, P.C.

(57) ABSTRACT

A disassembling device for removing fastening components embedded in a workpiece includes a supporting base, a clamping assembly, and a pushing assembly. The pushing assembly includes a sliding assembly, an adjusting rod, and an ejecting pin. The workpiece defines a first through hole which communicates with a positioning hole. The workpiece is clamped by the clamping assembly, the sliding assembly is connected to the supporting base and can slide along a first direction and a second direction perpendicular to the first direction. The adjusting rod passes through the sliding assembly to connect with the ejecting pin, the ejecting pin is driven to extend into the first through hole and to move in a direction perpendicular to the first and second directions, so as to push the fastening component out of the positioning hole.

10 Claims, 5 Drawing Sheets

(56) References Cited

U.S. PATENT DOCUMENTS

| | | | | |
|---|---|---|---|---|
| 6,955,345 B2* | 10/2005 | Kato | ............ | B23Q 1/5437 |
| | | | | 269/61 |
| 7,104,870 B2* | 9/2006 | Fong | ............ | B23F 19/002 |
| | | | | 451/48 |
| 7,959,141 B2* | 6/2011 | Makino | ............ | G03B 27/62 |
| | | | | 269/61 |
| 8,517,363 B2* | 8/2013 | Makino | ............ | H01L 21/682 |
| | | | | 269/73 |
| 8,784,155 B2* | 7/2014 | Guo | ............ | B23Q 1/626 |
| | | | | 451/5 |
| 9,016,678 B2* | 4/2015 | Wang | ............ | B23Q 1/44 |
| | | | | 269/56 |
| 9,073,152 B2* | 7/2015 | Westwood | ............ | B23K 37/0435 |
| 9,205,519 B2* | 12/2015 | Williams | ............ | B23P 19/041 |
| 2002/0083751 A1* | 7/2002 | Heffron | ............ | B23P 9/02 |
| | | | | 72/110 |
| 2011/0245052 A1* | 10/2011 | Ohno | ............ | B23P 19/06 |
| | | | | 483/18 |
| 2012/0152069 A1* | 6/2012 | Hyatt | ............ | B23B 29/03446 |
| | | | | 82/123 |
| 2012/0174366 A1* | 7/2012 | Hahn | ............ | E21C 35/19 |
| | | | | 29/244 |
| 2023/0014368 A1* | 1/2023 | Chen | ............ | B25B 27/023 |

* cited by examiner

DISASSEMBLING DEVICE

FIELD

The subject matter herein generally relates to disassembling tools, and more particularly, to a disassembling device.

BACKGROUND

Different parts of a device may be fixed together by fastening components such as pins. The pins are inserted into blind holes of the different parts by interference fit or adhesive. However, the fastening components are hard to remove from the device, and the disassembly process may cause damage to the fastening components. Therefore, there is a room for improvement in the art.

BRIEF DESCRIPTION OF THE DRAWINGS

Implementations of the present technology will now be described, by way of example only, with reference to the attached figures.

DETAILED DESCRIPTION

Figure 1:
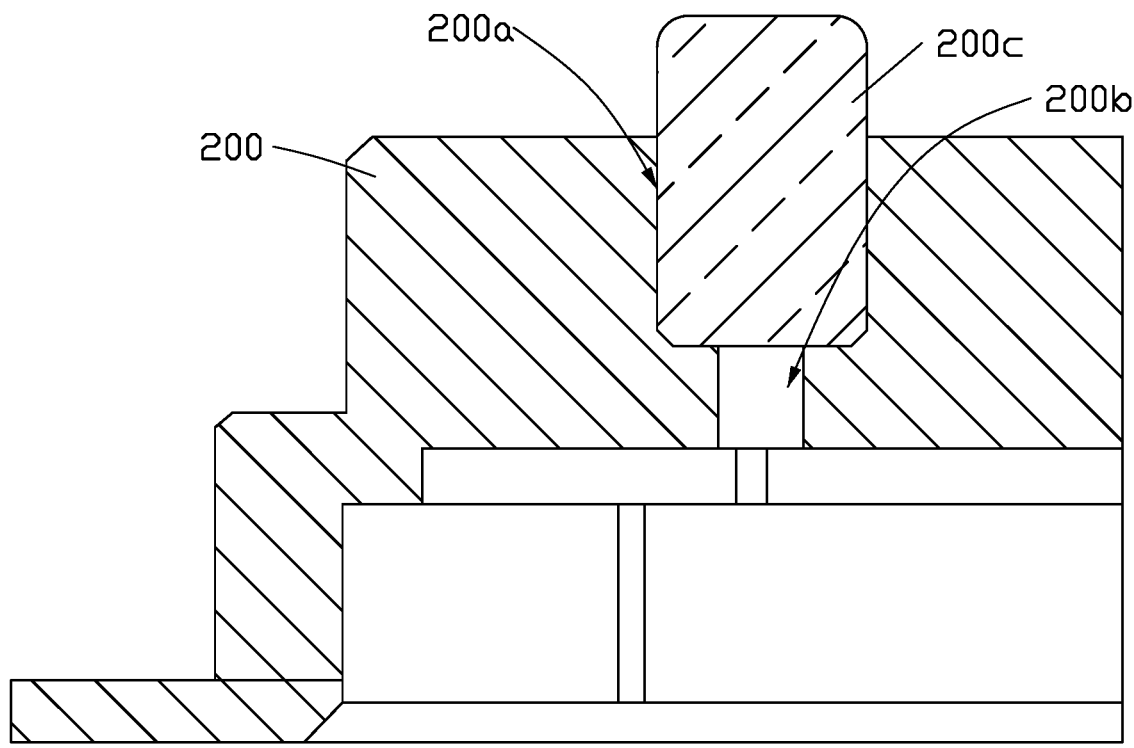
FIG. 1 is a cross-sectional view of an embodiment of a workpiece according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Referring to FIG. 1, an embodiment of a workpiece 200 is provided. The workpiece 200 defines a positioning hole 200a and a first through hole 200b communicating with the positioning hole 200a. A radius of the first through hole 200b is smaller than a radius of the positioning hole 200a. One or more positioning holes 200a are used for mounting components 200c therein, such as pins, magnets, and the like.

Figure 2:
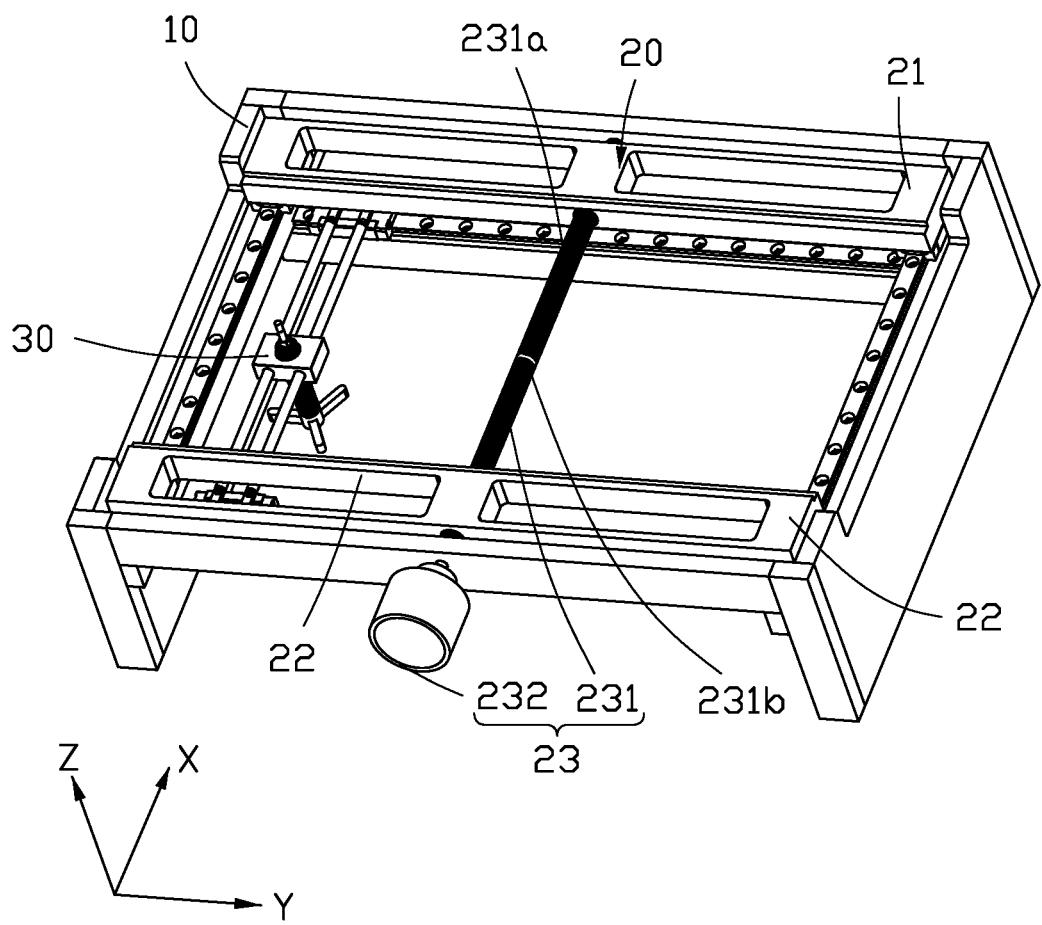
FIG. 2 is a diagrammatic view of an embodiment of a disassembling device according to the present disclosure.

Referring to FIG. 2, an embodiment of a disassembling device 100 is provided. The disassembling device 100 can remove the component 200c from the positioning hole 200a. The disassembling device 100 includes a supporting base 10, a clamping assembly 20, and a pushing assembly 30. The supporting base 10 can support the workpiece 200. The clamping assembly 20 is disposed on the supporting base 10 for clamping and fixing the workpiece 200 on the supporting base 10. The pushing assembly 30 is slidably connected to the supporting base 10. The pushing assembly 30 extends into the first through hole 200b and pushes the component 200c out of the positioning hole 200a.

Figure 3:
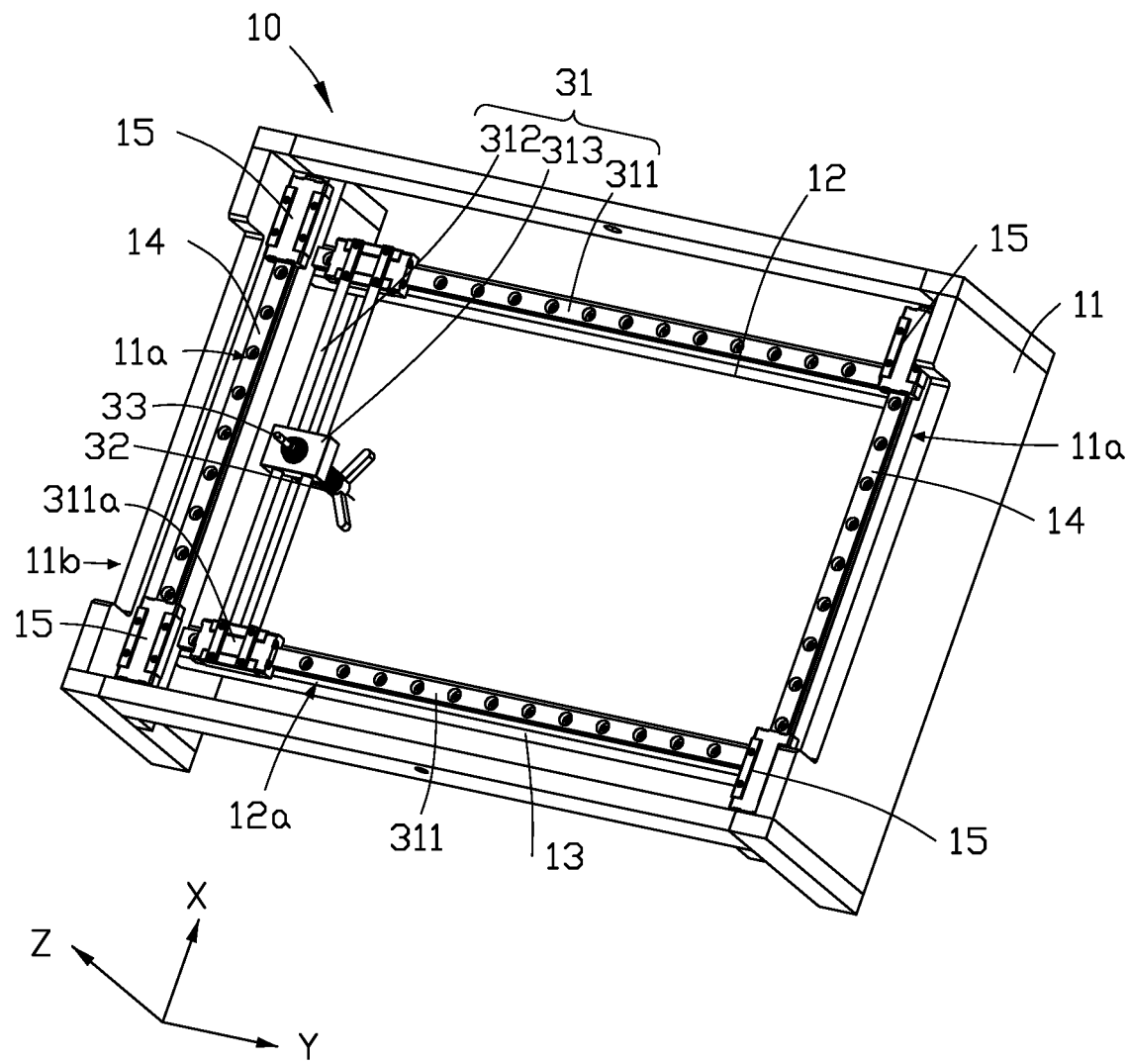
FIG. 3 is a diagrammatic view of a supporting base and a pushing assembly of the disassembling device of FIG. 2.

Referring to FIG. 3, the supporting base 10 includes a mounting frame 11, a first cross beam 12, and a second cross beam 13. The first cross beam 12 and the second cross beam 13 are parallel to each other. One end of the first cross beam 12 and one end of the second cross beam 13 are connected to the mounting frame 11. The pushing assembly 30 can be mounted on the first cross beam 12 and the second cross beam 13. The mounting frame 11 includes opposite sides, each side is provided with a mounting portion 11a for mounting a guiding rail 14. The guiding rail 14 is disposed along a first direction X. Both ends of the guiding rail 14 are provided with first moving blocks 15, which are used for connecting the clamping assembly 20. Mounting surfaces 12a defined by the first cross beam 12 and the second cross beam 13 are disposed at different heights from a plane where the mounting portion 11a is disposed, so as to prevent the clamping assembly 20 and the pushing assembly 30 from interfering each other.

Two sides of the supporting base 10 along the first direction X are provided with openings 11b for the workpiece 200 to pass through, which is convenient for placement of a long workpiece 200.

In some embodiments, a side of the supporting base 10 along the first direction X is further provided with a sensor (not shown). The sensor can sense the presence of the workpiece 200 on the supporting base 10.

Referring to FIGS. 2 and 3, the clamping assembly 20 includes a first plate 21, a second plate 22, and a clamping member 23. The first plate 21 is spaced apart from the second plate 22. Both ends of the first plate 21 are disposed on the first moving blocks 15 at one end of each of the guiding rails 14, and slide on the guiding rails 14 along the first direction X. Both ends of the second plate 22 are disposed on the first moving blocks 15 at the other end of each of the guiding rails 14, and slide on the guiding rails 14 along the first direction X. The clamping member 23 is disposed on the mounting frame 11, and is connected to the first plate 21 and the second plate 22. The clamping member 23 drives the first plate 21 and the second plate 22 toward each other to clamp the workpiece 200, or moving away from each other to release the workpiece 200.

The clamping member 23 includes a connecting rod 231 and a rotating member 232. Both ends of the connecting rod 231 are connected to the mounting frame 11. The connecting rod 231 passes through the first plate 21 and the second plate 22, and is connected to the rotating member 232. The connecting rod 231 includes a first thread 231a and a second thread 231b spaced apart from each other. The first plate 21 is connected to the first thread 231a, and the second plate 22 is connected to the second thread 231b. Helical directions of the first thread 231a and the second thread 231b are opposite to each other, so that the first plate 21 and the second plate 22 can move toward or away from each other. The rotating member 232 can rotate the connecting rod 231, thereby moving the first plate 21 and the second plate 22 toward or away from each other through the first thread 231a and the second thread 231b. In some embodiments, the rotating member 232 is also connected to a motor (not shown). When the workpiece 200 is disposed on the supporting base 10, the sensor and the motor cooperatively control the movement of the first plate 21 and the second plate 22, so as to realize automatic clamping of the workpiece 200.

Referring to FIGS. 2 and 3, the pushing assembly 30 includes a sliding assembly 31, an adjusting rod 32, and an ejecting pin 33. The sliding assembly 31 is connected to the first cross beam 12 and the second cross beam 13, and slides both along the first direction X and a second direction Y perpendicular to the first direction X. One end of the adjusting rod 32 passes through the sliding assembly 31, and is connected to the ejecting pin 33. The sliding assembly 31 drives the ejecting pin 33 to move, so that the ejecting pin 33 aligns with the position of the first through hole 200b. The adjusting rod 32 drives the ejecting pin 33 to extend into the first through hole 200b, and moves the ejecting pin 33 in a third direction Z perpendicular to the first direction X and the second direction Y, so as to push the component 200c out of the positioning hole 200a.

The sliding assembly 31 includes two sliding rails 311, at least one sliding rod 312, and a sliding block 313. The two sliding rails 311 are mounted on the mounting surfaces 12a of the first cross beam 12 and the second cross beam 13, and are disposed along the second direction Y. Each sliding rail 311 is provided with a second moving block 311a. Two ends of the at least one sliding rod 312 are connected to the two sliding rails 311 through the second moving sliding blocks 311a, and the at least one sliding rod 312 is disposed along the first direction X. The sliding block 313 is slidably disposed on the sliding rod 312 along the first direction X.

Figure 4:
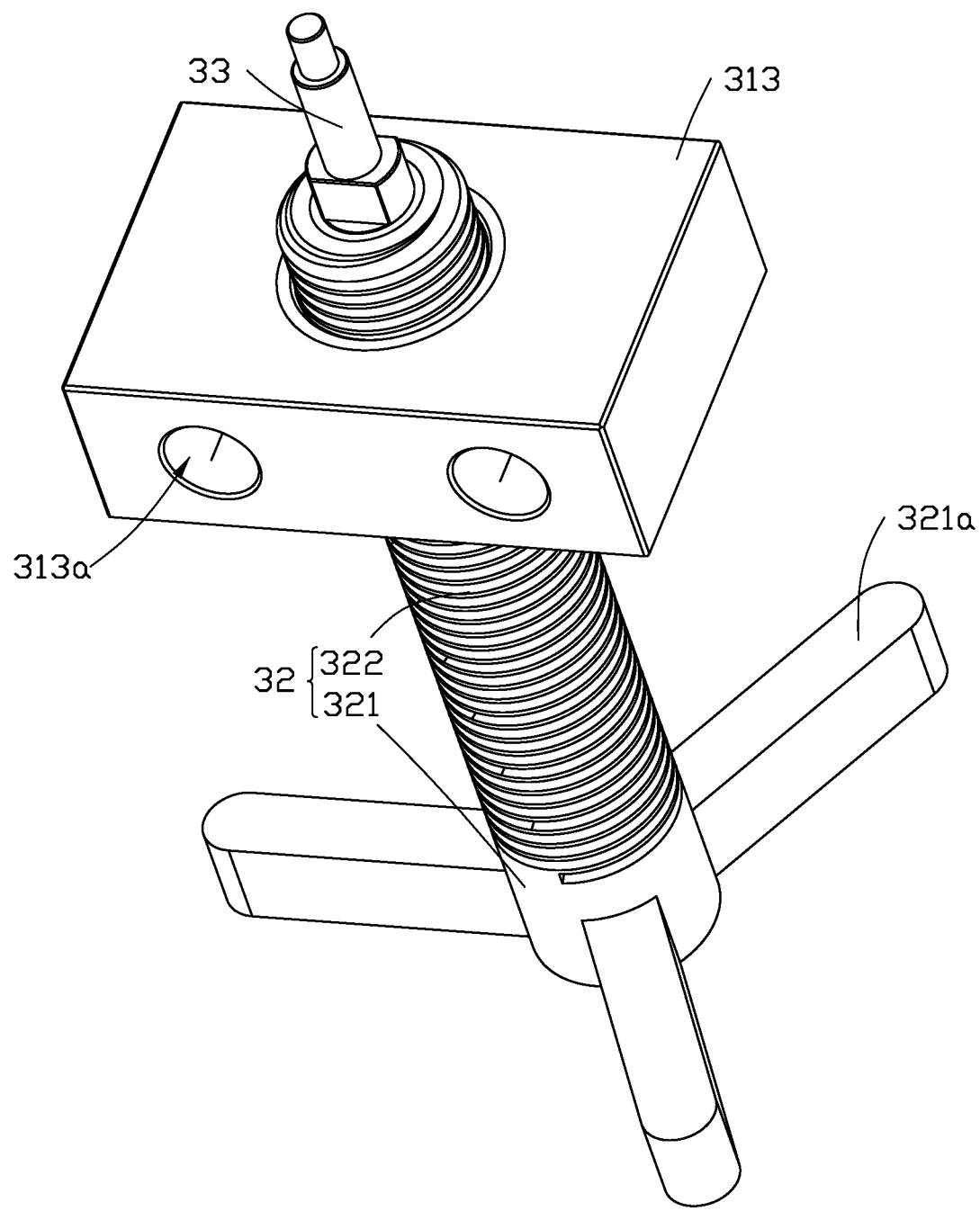
FIG. 4 is a diagrammatic view of the pushing assembly of FIG. 3.

Referring to FIGS. 3 and 4, the sliding block 313 is provided with two second through holes 313a parallel to the first direction X. Each second through hole 313a is provided with one sliding rod 312. The sliding block 313 is fixed by the two sliding rods 312 to prevent the sliding block 313 from rotating on the sliding rod 312. Thus, the ejecting pin 33 and the first through hole 200b can be positioned on the workpiece 200. In some embodiments, an inner wall of the second through hole 313a or a surface of the sliding rod 312 is provided with a friction layer (not shown), which is convenient for the positioning of the sliding block 313 on the sliding rod 312.

In some embodiments, the sliding rod 312 is a screw rod. The sliding rod 312 is rotatably connected to the second moving block 311a. One end of the sliding rod 312 protrudes from the second moving block 311a, and is connected to the motor. The sliding rod 312 is rotated by the motor, thereby driving the sliding block 313 to move along the first direction X on the sliding rod 312. In some embodiments, the sliding rail 311 can be designed as a screw rod and connected to the motor. The second moving block 311a is connected to the screw rod. The screw rod is rotated by the motor, thereby moving the second moving block 311a along the second direction Y, so as to realize automatic control of the movement of the ejecting pin 33 along the first direction X and the second direction Y.

Referring to FIG. 4, the adjusting rod 32 includes a rotating portion 321 and an adjusting portion 322. The adjusting portion 322 connects the sliding block 313 and the rotating portion 321. The ejecting pin 33 is disposed at one end of the adjusting portion 322 away from the rotating portion 321. The adjusting portion 322 is connected to the sliding block 313 by screw threads. The rotating portion 321 is provided with a pushing rod 321a along a circumferential direction of the adjusting portion 322. The pushing rod 321a rotates the adjusting rod 32, so that the ejecting pin 33 moves toward the first through hole 200b. In some embodiments, the rotating portion 321 is connected to the motor, and the adjusting portion 322 is rotated by the motor.

Figure 5:
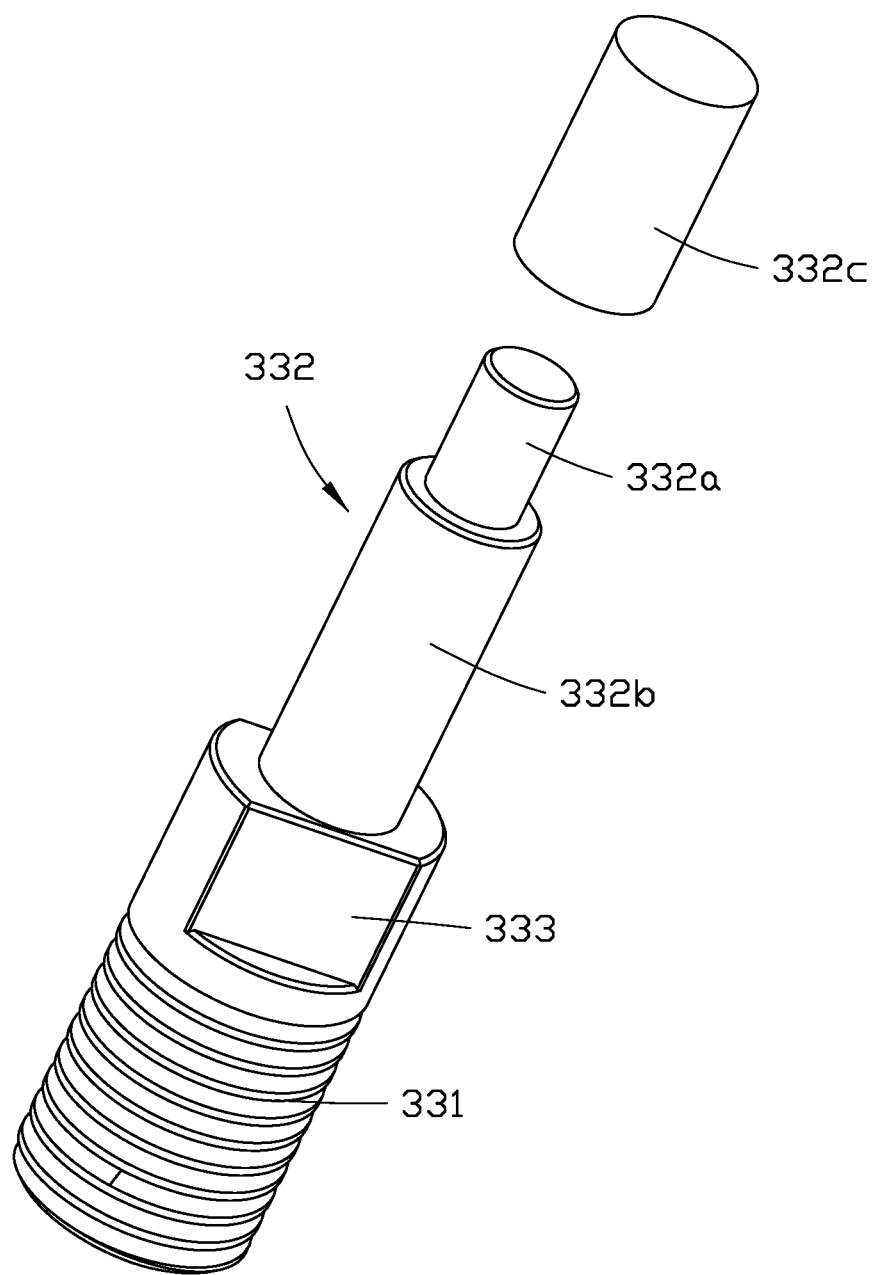
FIG. 5 is a diagrammatic view of an ejecting pin of the pushing assembly of FIG. 4.

Referring to FIGS. 4 and 5, the ejecting pin 33 includes a connecting column 331 and a lifting column 332. The connecting column 331 is detachably connected to the adjusting portion 322. The ejecting pins 33 with different diameters and different lengths can be applied to the first through holes 200b of different sizes.

The lifting column 332 includes a first column 332a and a second column 332b which are integrally formed. A diameter of the first column 332a is smaller than that of the second column 332b. The second column 332b is connected to the connecting column 331. The first column 332a is sleeved with a flexible block 332c to avoid rigid contact between the first column 332a and the component 200c. Thus, damage to the component 200c is avoided. Furthermore, the flexible block 332c also avoids rigid contact between the first column 332a and the first through hole 200b, and the first column 332a and the positioning hole 200a, so damage to the workpiece 200 is also avoided.

In some embodiments, a rotating block 333 is further provided between the connecting column 331 and the lifting column 332, so that the ejecting pin 33 can be easily installed on and removed from the adjusting portion 322.

In some embodiments, the rotating block 333, the connecting column 331, and the adjusting portion 322 are integrally formed. The lifting column 332 is detachably connected to the rotating block 333.

In some embodiments, the disassembling device 100 further includes an image capturing device (not shown) disposed on the supporting base 10. The image capturing device can capture images of the workpiece 200 after the workpiece 200 is clamped by the clamping assembly 20, obtain the position of the positioning hole 200a on the workpiece 200, and send the position of the positioning hole 200a to a controller (not shown). The controller is connected to the clamping assembly 20 and the pushing assembly 30. The controller can also be connected to the sensor and the motor. The sensor senses the presence of the workpiece 200, the motor moves the first plate 21 and the second plate 22 to automatically clamp the workpiece 200. The controller is electrically connected to the motor to control the ejecting pin 33 to move along the first direction X, the second direction Y, and the third direction Z, so that the ejecting pin 33 extends into and pushes the component 200c out of the positioning hole 200a.

When the disassembling device 100 is in use, the workpiece 200 is clamped on the supporting base 10 by the clamping assembly 20, thereby the positioning hole 200a on the workpiece 200 is fixed. By moving the sliding assembly 31 along the first direction X and the second direction Y, the ejecting pin 33 is aligned with the first through hole 200b. The ejecting pin 33 is driven by the adjusting rod 32 to move toward the first through hole 200b, so that the ejecting pin 33 extends into the first through hole 200b and abuts against the component 200c in the positioning hole 200a. The adjusting rod 32 drives the ejecting pin 33 to continue moving and thereby removes the component 200c from the positioning hole 200a. The risk of damage to the component 200c and the workpiece 200 is reduced, the component 200c and the workpiece 200 can be used again, waste is reduced, and cost is saved.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A disassembling device configured to disassemble a component from a positioning hole of a workpiece, the workpiece defining a first through hole communicating with the positioning hole, the disassembling device comprising:
    a supporting base;
    a clamping assembly disposed on the supporting base, the clamping assembly comprising a first plate, a second plate, and a clamping member, the clamping member is connected to the first plate and the second plate; and
    a pushing assembly comprising a sliding assembly, an adjusting rod, and an ejecting pin,
    wherein the clamping assembly is configured to fix the workpiece along a first direction, the clamping member is configured to drive the first plate and the second plate to move toward each other to clamp the workpiece, and is further configured to drive the first plate and the second plate to move away from each other to release the workpiece; the sliding assembly is connected to the supporting base and slides along both the first direction and a second direction perpendicular to the first direction; one end of the adjusting rod passes through the sliding assembly and is connected to the ejecting pin, the adjusting rod is configured to drive the ejecting pin to extend into the first through hole and move in a third direction perpendicular to the first direction and the second direction, so as to push the component out of the positioning hole.

2. The disassembling device of claim 1, wherein the sliding assembly comprises a sliding block, a sliding rod, and two sliding rails; the sliding rod is disposed along the first direction, the sliding block is slidably connected to the sliding rod; each of the two sliding rails is disposed on the supporting base along the second direction, and the sliding rod is slidably disposed on the two sliding rails.

3. The disassembling device of claim 2, wherein the sliding block defines two second through holes parallel to the first direction, each of the two second through holes is provided with the sliding rod.

4. The disassembling device of claim 1, wherein the adjusting rod comprises a rotating portion and an adjusting portion, the adjusting portion connects the sliding assembly and the rotating portion, the rotating portion is provided with a pushing rod along a circumferential direction of the adjusting portion, one end of the adjusting portion facing away from the rotating portion is connected to the ejecting pin.

5. The disassembling device of claim 1, wherein the ejecting pin comprises a connecting column and a lifting column connected to the connecting column, the connecting column is detachably connected to the adjusting rod.

6. The disassembling device of claim 5, wherein the lifting column comprises a first column and a second column, the first column and the second column are integrally formed, a diameter of the first column is smaller than a diameter of the second column, the second column is connected to the connecting column, the first column is sleeved with a flexible block.

7. The disassembling device of claim 1, wherein the supporting base is provided with a guiding rail disposed along the first direction, and the clamping assembly is disposed on the guiding rail to clamp the workpiece along the first direction.

8. The disassembling device of claim 1, wherein the clamping member comprises a connecting rod connected to the first plate and the second plate, the connecting rod includes a first thread and a second thread spaced apart from each other, and helical directions of the first thread and the second thread are opposite to each other.

9. The disassembling device of claim 8, wherein the clamping member further comprises a rotating member connected to the connecting rod, the rotating member is configured to rotate the connecting rod, thereby moving the first plate and the second plate toward or away from each other through the first thread and the second thread.

10. The disassembling device of claim 1, wherein two sides of the supporting base along the first direction are respectively provided with openings for the workpiece to pass through.

* * * * *